United States Patent [19]

Hedges

[11] 4,245,319
[45] Jan. 13, 1981

[54] ENERGY MANAGEMENT METHOD AND APPARATUS UTILIZING DUTY CYCLE REDUCTION SYNCHRONIZED WITH THE ZERO POINTS OF THE APPLIED VOLTAGE

[75] Inventor: Walter P. Hedges, Laveen, Ariz.

[73] Assignee: Cyborex Laboratories, Inc., Phoenix, Ariz.

[21] Appl. No.: 21,347

[22] Filed: Mar. 19, 1979

[51] Int. Cl.³ .................. H02J 13/00; G05B 19/00
[52] U.S. Cl. .................. 364/493; 364/492; 307/129; 307/38; 307/31
[58] Field of Search .................. 307/31, 32, 35, 38, 307/40, 41, 129; 340/147 F; 364/492, 493; 363/164, 165

[56] References Cited

U.S. PATENT DOCUMENTS

| | | | |
|---|---|---|---|
| 4,060,709 | 11/1977 | Hanson | 364/493 |
| 4,064,485 | 12/1977 | Leyde | 364/492 |
| 4,136,392 | 1/1979 | Westphal et al. | 364/492 |
| 4,153,936 | 5/1979 | Schmitz et al. | 364/493 |

Primary Examiner—Charles E. Atkinson
Assistant Examiner—Gary Chin
Attorney, Agent, or Firm—Cahill, Sutton & Thomas

[57] ABSTRACT

Energy management method and apparatus for use in conjunction with a demand-limited alternating current circuit having a plurality of separate loads, including resistive loads, and means for automatically shedding certain of the loads when the actual demand of the circuit exceeds the demand limit. The actual demands of the loads in operation are sensed and the demands of at least certain of the operative resistive loads are separately sensed. The duty cycle of the power applied to at least certain of the operative resistive loads is reduced by switching these loads "off" and "on" synchronously with the zero points of the applied voltage. An overall reduction in the actual demand of the circuit is thereby effected when the failure to make such reduction would otherwise cause certain of the operating loads to be completely shed.

2 Claims, 3 Drawing Figures

ENERGY MANAGEMENT METHOD AND APPARATUS UTILIZING DUTY CYCLE REDUCTION SYNCHRONIZED WITH THE ZERO POINTS OF THE APPLIED VOLTAGE

This invention relates to methods and apparatus for electrical energy management.

More particularly, the invention pertains to methods and apparatus for adjusting the total demand of a circuit which includes a plurality of loads, including resistive loads, to achieve optimum utilization of the allowable power available to a circuit which is demand-limited.

In a further aspect, the invention concerns methods and apparatus whereby a demand-limited alternating current circuit which includes resistive loads can be regulated to avoid totally shedding one or more resistive loads when the total demand, including uncontrolled loads, exceeds the demand limit.

DESCRIPTION OF THE PRIOR ART

Various energy management systems have been proposed which require or at least attempt to persuade utility customers to limit their electrical energy consumption as a means of reducing their overall utility bills. According to one such proposal, the maximum load ("demand") which each customer is allowed to place on the utility's power generation facilities is arbitrarily limited. Although this "peak usage curtailment" approach is partially effective in reducing the customer's overall utility bills, it has several decided disadvantages. The customer, especially a residential user, loses a degree of flexibility in selecting and using various electrical appliances, etc., in his residence and to this extent, the peak usage curtailment program has direct and often undesirable impact on the customer's lifestyle. Secondly, the utility itself may find that the reduction in total electrical energy consumption reduces the utility's revenue to the point that it must, in turn, raise the utility charge per unit of electrical power consumed to the point that the user's electrical utility bills may even exceed the bills he customarily received before his power usage was curtailed.

In a variation of the peak usage curtailment approach, each residential customer is allowed to choose his own demand limit and is encouraged to set his own limit to the lowest possible value by imposing considerably higher rates for power used during the utility's peak demand periods. Thus, each consumer can decide for himself the extent to which peak usage curtailment programs will be allowed to interfere with his lifestyle.

Whether a demand limit is arbitrarily imposed by the utility or set by the customer, the demand limiting energy management methods and apparatus of the prior art react by automatically shedding loads until the total demand of the circuit is reduced to below the demand limit. In the ideal situation, the value of the load or loads shed would be just equal to the amount by which the actual demand exceeds the demand limit. However, in practice, this rarely occurs and in the more typical situation, the value of the load or loads shed is greater than the excess demand. Thus, when these loads are shed, the resultant actual demand imposed by the remaining loads in operation falls significantly below the demand limit. This has an undesirable effect on both the consumer and the utility. The consumer is forced to do completely without certain appliances and utilize even less power than he is allowed by the demand limit, thus undesirably affecting his lifestyle. From the utility company's standpoint, a reduction in the actual load to below the demand limit is undesirable because its revenues are lowered even though it must keep power generation facilities on line to satisfy the demand limits of all of its customers.

Accordingly, it would be highly desirable to provide methods and apparatus for use in connection with demand-limit circuits which would function to enable each power consumer to utilize a higher percentage of the allowable power available under his particular demand limit.

FIELD OF THE INVENTION

It is therefore an object of the present invention to provide energy management methods and apparatus which enable a demand-limited circuit, operating close to its demand limit, to respond to additional demands or a reduction in demand limit in ways other than by completely shedding one or more loads in the circuit.

Yet another object of the invention is to provide such methods and apparatus which allow a demand-limited circuit to respond to increased demands or reduction in demand limits in such fashion as to keep the actual demand of the circuit closer to or equal to the demand limit.

These and other, further and more specific objects and advantages of the invention will be apparent to those skilled in the art from the following detailed description, taken in conjunction with the drawings, in which:

SUMMARY OF THE INVENTION

Briefly, in accordance with the invention, I provide energy management methods and apparatus for use in conjunction with a demand-limited alternating current circuit, which circuit includes a plurality of separate loads, including resistive loads and means for automatically shedding certain of the loads when the actual demand of the circuit exceeds the demand limit.

The method and apparatus of the present invention include the steps of and means for establishing a demand limit for the circuit, sensing the actual demand of those loads in the circuit which are then in operation, including sensing the demands imposed by at least certain of the operative resistive loads in the circuit, and reducing the duty cycle of the applied power furnished to at least certain ones of the operative resistive loads to effect an overall reduction in the actual demand of the circuit when the failure to make such reduction would otherwise cause certain of the operating loads to be completely shed. The duty cycle of the applied power furnished to the selected operative resistive loads is reduced by switching the loads off and on synchronously with the zero points of the applied voltage.

The methods and apparatus of the invention make use of the fact that the power consumed by a resistive load is directly reduced by reducing the duty cycle of the alternating current supplied to the load. Thus, for example, the power consumed by an electrical hot water heater will be reduced by 10% by reducing the duty cycle of the current to the heating element by 10% by subtracting 6 cycles per second from the normal 60 cps current to 54 cycles per second. Thus, if the desired reduction in the total demand of a circuit can be effected by this technique rather than by completely shedding the water heater load, the consumer can still have hot water (in reduced volume) and yet the utility company's revenues are not reduced by the full normal demand of the water heater but only by 10%.

DESCRIPTION OF THE PREFERRED EMBODIMENTS

Figure 1:
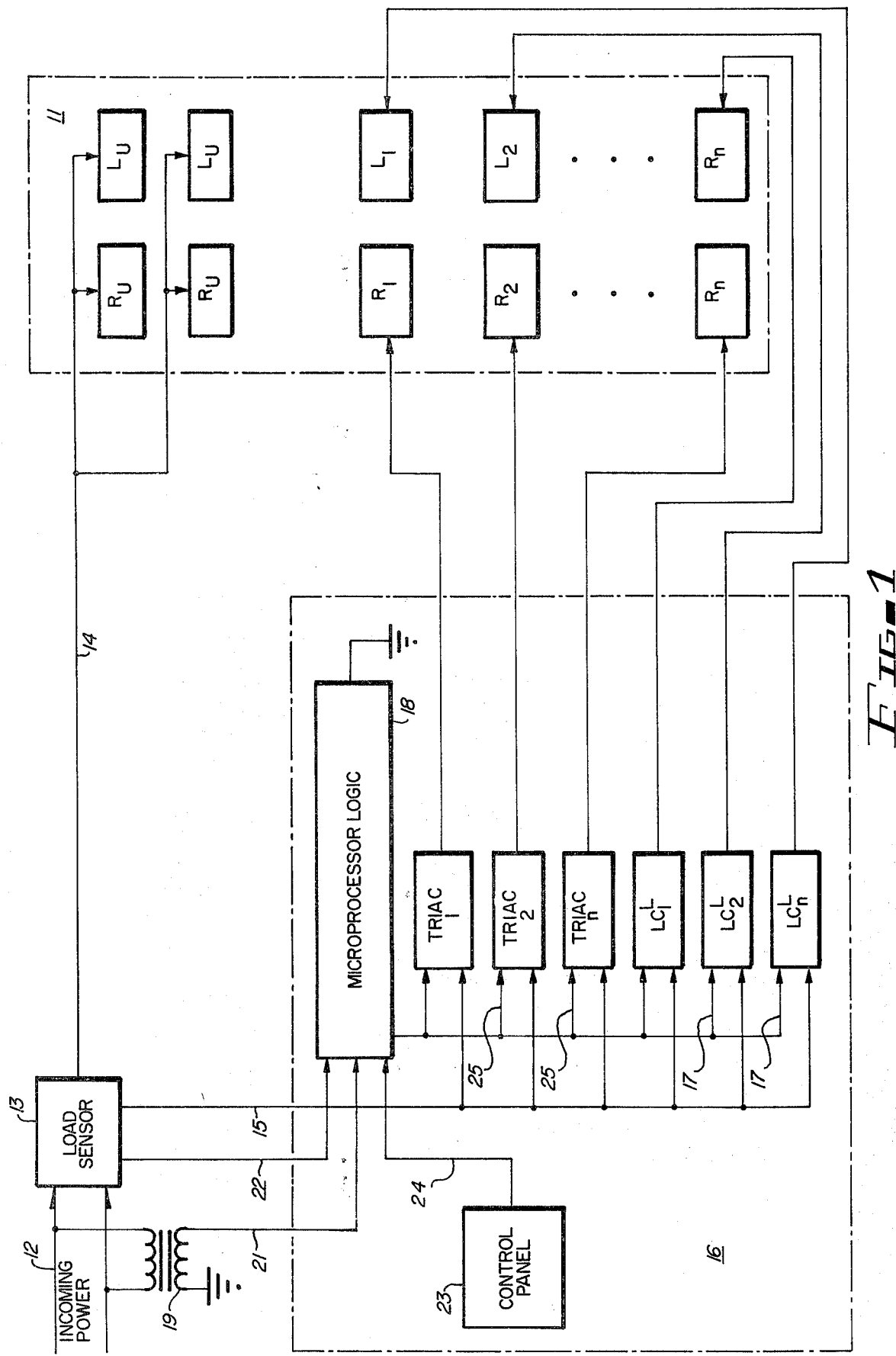
FIG. 1 is a schematic illustrating the operation of the methods and apparatus of the present invention in controlling power usage in a demand-limited residential circuit containing both controlled and uncontrolled resistive and inductive loads.

Turning now to the drawings, FIG. 1 illustrates a typical residential circuit 11 consisting of uncontrolled resistive loads $R_U$ and uncontrolled inductive loads $L_U$ and controlled resistive loads $R_1, R_2 \ldots R_n$, and controlled inductive loads $L_1, L_2 \ldots L_n$. Incoming power from the utility transmission lines 12 passes through a load sensor 13 which measures the total current applied to all of the loads in the circuit 11 and is transmitted directly to the uncontrolled loads through electrical conductors 14. Power to the controlled loads is transmitted via conductor 15 to a load control system 16 which contains a load control device ("LC") for each of the controlled resistive and inductive loads of the circuit 11. The load control devices for the inductive loads, $LC^{L1}, LC^{L2} \ldots LC^{Ln}$ (preferably relays) pass current directly from the conductor 15 to the inductive loads $L_1, L_2 \ldots L_n$ in response to receipt of command signals 17 from the logic of a microprocessor 18. Power from the conductor 15 is passed through duty cycle control devices (TRIACs) and then to the resistive loads $R_1, R_2 \ldots R_n$. The microprocessor logic receives information as to the frequency of the incoming power from a transformer 19 which generates a frequency information signal 21 and from the load sensor 13 which generates and tramsmits a total actual demand signal 22. Load priority and demand-limit information is entered by the utility and/or consumer at the control panel 23 which generates demand-limit and add-shed priority signals 24. The microprocessor generates ON-OFF signals 25 which control the operation of the TRIACs.

In operation, the system of FIG. 1 operates as follows. The microprocessor senses which of the controlled resistive and inductive loads are actually in operation and the value of those operative loads. The microprocessor also reads the total demand signal 22. If the total demand exceeds the preselected demand limit, the microprocessor scans the operative resistive loads and according to customer-selected priority, determines whether a reduction in power to one or more of the operative controlled resistive loads can be effected to reduce the actual demand to the value equal to the demand limit. The microprocessor then selects a percentage reduction in the duty cycle of the power to be supplied to the controlled operative resistive loads and generates ON-OFF signals to the TRIACs of the resistive loads selected for duty cycle reduction. The TRIACs react to the ON-OFF commands from the microprocessor to "steal" cycles from the incoming power and apply the reduced duty cycle power to the selected controlled resistive loads.

Figure 2:
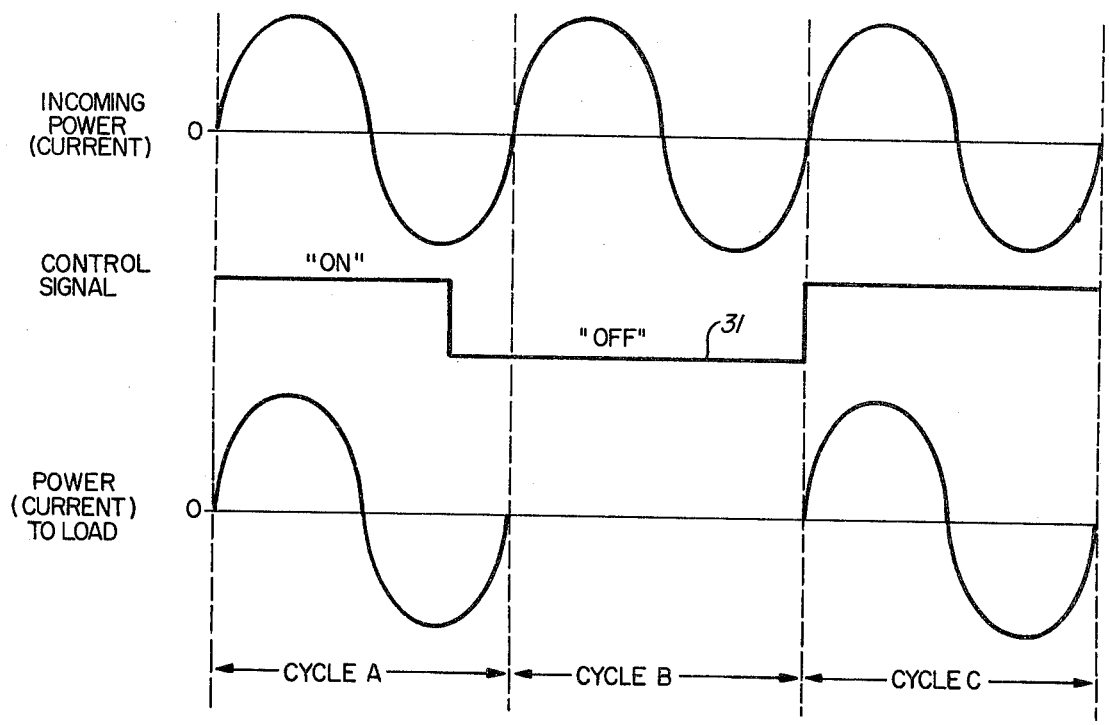
FIG. 2 is a graphical illustration of the incoming power to the circuit of FIG. 1, the controlled signal which regulates the power supplied to certain of the resistive loads of the circuit and the power actually applied to one of the controlled resistive loads.

The operation of the system is further illustrated by reference to FIG. 2 which is a graphic comparison of the incoming power, TRIAC control signals and power applied to a resistive load. As is well known to those skilled in the art, a TRIAC reacts to a "CURRENT OFF" signal applied at any point in the power (or current) cycle to cause the current to be interrupted the next time the current and voltage passes through zero and reacts to a "POWER ON" signal to conduct current any time the ON signal is applied. By proper timing of the application of the ON and OFF signals to the TRIAC, one can then subtract entire cycles from the incoming power and proportionately reduce the power consumption of the load. Thus, as illustrated in FIG. 2, if the OFF signal 31 is applied to the TRIAC at any time during the last half of the incoming power cycle A, power will be applied to the load during the entire cycle A. However, when the incoming power during the last half of cycle A passes through zero, the TRIAC will interrupt the current flow. An "ON" control signal 32 applied at the beginning of cycle C will cause the TRIAC to conduct and power cycle C will be applied to the load. It will be understood to those skilled in the art that the ON signal 32 could be applied at any portion of the incoming power cycle B, causing the TRIAC to conduct and applying power to the load. However, in order to avoid generating voltage or current transients, the ON signal 32 is applied as the incoming voltage power and current passed through zero at the commencement of cycle C. The points at which cycles are subtracted from the incoming power can be spaced apart to minimize the effect of the duty cycle reduction on the resistive load so as, for example, to avoid flickering of banks of incandescent lights. For example, with an incoming 60-cycle signal, the microprocessor logic would preferably generate command signals to a TRIAC to subtract one cycle every 10 cycles, in order to effect a 10% reduction in the power applied to the load.

Figure 3:
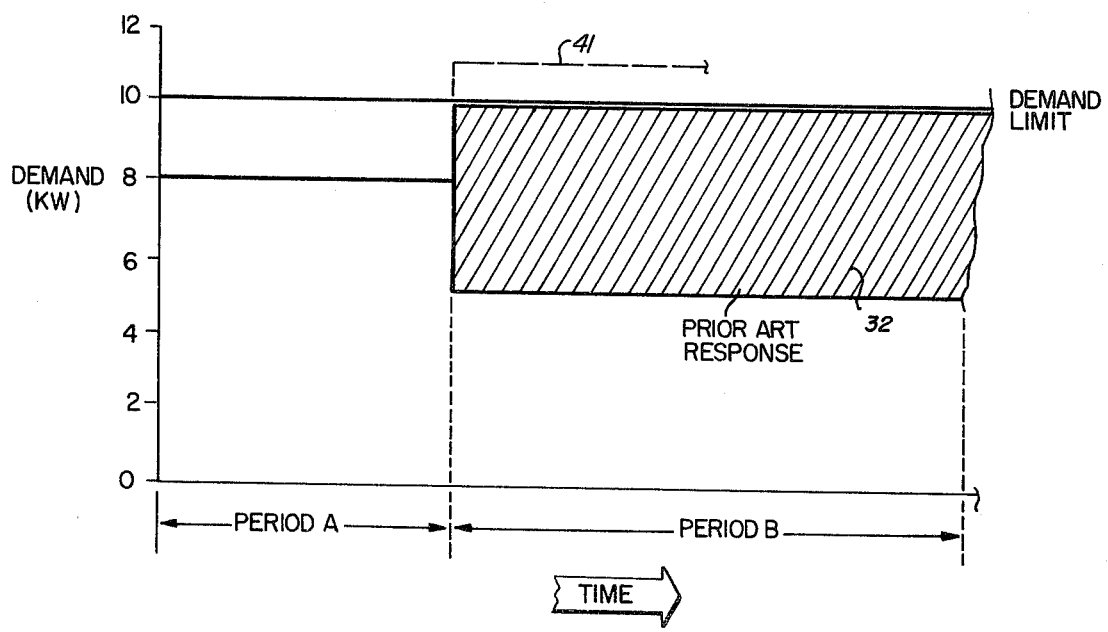
FIG. 3 is a graphical illustration of the power usage in the circuit of FIG. 1 controlled in accordance with the prior art in comparison to a system controlled in accordance with the principles of the present invention.

The effect of the methods and apparatus of the invention on the consumption in a typical residential circuit is illustrated in FIG. 3. It is assumed that the residential consumer has selected a 10 KW demand limit and it is assumed that the combination of controlled and uncontrolled loads in operation in his residence imposes an actual demand of 8 KW, as shown during period A. Finally, it is assumed that according to user-selected priority, the first load to be shed in the event of an increase in demand to above the demand limit is a 6 KW resistive load.

At the beginning of period B, it is assumed that another uncontrolled load of 3 KW is placed in operation by the consumer. In a non-demand-limited circuit, this would cause the demand to rise to the total of 11 KW, as indicated by the dashed line 31. In a demand-limited circuit of the prior art, the 6 KW load selected by the consumer would be automatically shed, reducing the actual demand of the entire residential circuit to only 5 KW, depriving the consumer entirely of the use of the 6 KW load and reducing the utility company's revenues because the demand-limited system could only respond to the increased demand by completely shedding the 6 KW load.

However, by contrast, an energy management system embodying the present invention would react to the situation by simply reducing the power applied to the 6 KW resistive load by 16+%, thus reducing the total demand from 11 KW to 10 KW, the demand limit, and the consumer retains the use at 90% of its capacity of the nominal 6 KW load and the utility company actually obtains increased revenue, as indicated by the power shaded area 32 representing power actually utilized by the consumer which would not be utilized in accordance with the prior art.

Having described my invention in such terms as to enable those skilled in the art to understand and practice it, and having identified the presently preferred embodiments thereof, I claim:

1. A energy-management method for use in conjunction with a demand-limited alternating current circuit having a plurality of separate loads, including resistive loads, and means for automatically shedding certain of said loads when the actual demand of said circuit exceeds said demand limit, said method including:
  (a) establishing a demand limit for said circuit;
  (b) sensing the actual demand of those loads in said circuit which are in operation, including separately sensing the demands imposed by at least certain of the operative resistive loads in said circuit; and
  (c) reducing the duty cycle of the applied power furnished to at least certain ones of said operative resistive loads by switching said loads "off" and "on" synchronously with the zero points of the applied voltage, to effect an overall reduction in the actual demand of said circuit when the failure to make such reduction would otherwise cause certain of said operating loads to be completely shed.

2. Energy-management apparatus for use in a demand-limited alternating current circuit, which circuit includes a plurality of separate loads, including resistive loads, and means for automatically shedding certain of said loads when the actual demand of said circuit exceeds said demand limit, said apparatus including:
  (a) means for establishing a demand limit for said circuit;
  (b) means for sensing the actual demand of those loads in said circuit which are in operation, including separately sensing the demand imposed by at least certain of the operative resistive loads in said circuit; and
  (c) means for reducing the duty cycle of the applied power furnished to at least certain ones of said operative resistive loads by switching said loads "off" and "on" synchronously with the zero points of the applied voltage, to effect an overall reduction in the actual demand of said circuit when the failure to make such reduction would otherwise cause certain of said operating loads to be completely shed.

* * * * *